April 20, 1965   N. A. KEITH   3,178,806
METAL FABRICATION
Filed Dec. 11, 1961   4 Sheets-Sheet 1

*INVENTOR.*
NORVAL A. KEITH
BY
ATTORNEY

April 20, 1965   N. A. KEITH   3,178,806
METAL FABRICATION
Filed Dec. 11, 1961   4 Sheets-Sheet 2

INVENTOR.
NORVAL A. KEITH
BY
Henry Prusaczyk
ATTORNEY

April 20, 1965  N. A. KEITH  3,178,806
METAL FABRICATION

Filed Dec. 11, 1961  4 Sheets-Sheet 3

INVENTOR.
NORVAL A. KEITH
BY
ATTORNEY

April 20, 1965 N. A. KEITH 3,178,806
METAL FABRICATION

Filed Dec. 11, 1961 4 Sheets-Sheet 4

INVENTOR.
NORVAL A. KEITH
BY
ATTORNEY

United States Patent Office 3,178,806
Patented Apr. 20, 1965

3,178,806
METAL FABRICATION
Norval A. Keith, East Alton, Ill., assignor to Olin Mathieson Chemical Corporation, a corporation of Virginia
Filed Dec. 11, 1961, Ser. No. 158,612
17 Claims. (Cl. 29—157.3)

This invention relates to a hollow sheet metal article and more particularly to a method of manufacturing hollow articles, such as heat exchangers and the like, of sheet metal having integral fins extending externally therefrom.

In the manufacture of hollow articles such as refrigerator panels, condensers and the like, of sheet metal, it is desirable that such structures be provided with external fins for facilitating the transmission or dissipation of heat. Heretofore, such heat transfer fins were usually brazed or soldered on the structure posing a difficult manufacturing problem particularly where the article is a flat or oblong sheet metal thin walled tubing. This involves not only a complicated and time consuming operation, but in addition is an expensive procedure which frequently fails to result in a rigid and efficient joint between the elements. Such a procedure or operation is further complicated by the need for making good contact between the tube sheet and the fins for proper heat conduction as well as securely assembling the parts. Despite precautions taken for the efficiency and operation of the resultant product, the brazed or soldered joint is nevertheless of reduced heat exchange efficiency for lack of unimpeded heat transfer through the joint.

Accordingly, it is an object of this invention to provide a novel process for the manufacture of finned heat exchangers eliminating disadvantages of the prior art.

Another object of this invention is to provide a novel method for the manufacture of a heat exchanger having an extended heat transfer surface.

Still another object of this invention is to provide a novel method for the manufacture of thin walled relatively flat metal tube sheets having a plurality of integral fins projecting from an external surface of the tube sheet.

A further object of this invention is to provide a novel method for increasing the heat transfer surface of sheet metal type heat exchangers.

It is also an object of this invention to provide a novel method for the preparation of a simple, low-cost but improved heat exchanger.

A still further object of this invention is to provide a novel method for the preparation of a thin walled relatively flat sheet metal heat exchanger having a plurality of projecting integral fins and having improved heat transfer efficiency.

A still further object of this invention is to provide a novel method adapted to high speed mass production of finned sheet metal heat exchangers.

Other objects and advantages of this invention will become more apparent from the following description and drawings in which.

Figure 1:
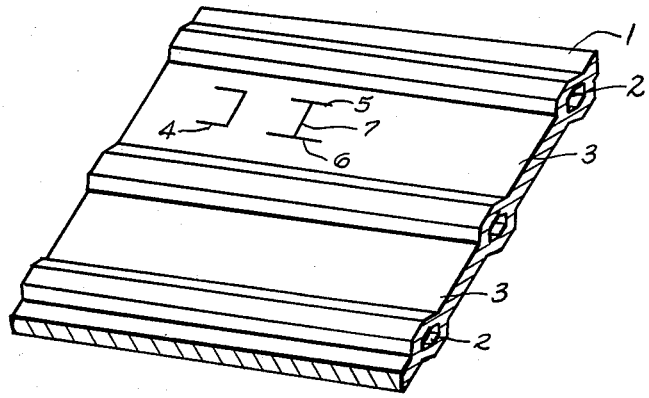
FIGURE 1 is a perspective view illustrating a portion of a heat exchanger construction from which the finished units of this invention may be fabricated.

Referring to the drawings, a typical heat exchanger adapted for processing in accordance with this invention is indicated by the numeral 1, in FIGURE 1, and comprises a substantially solid sheet of metal having extending internally thereto a plurality of fluid passages or conduits 2 separated by substantially solid web sections 3 bounding tubes 2 so as to adapt them for containment of a fluid. Briefly, one method for fabricating the heat exchanger 1 is disclosed in U.S. Letters Patent No. 2,690,002, granted to Grenell on September 28, 1954. This method, as fully disclosed in the aforesaid patent, comprises the application of a pattern of weld inhibiting or stop-weld material to a clean surface of a sheet of metal. A clean surface of a second sheet of metal is superimposed on the first said surface and the two sheets are secured together to prevent relative movement therebetween. Thereafter, the two sheets are welded together by hot rolling so that the adjacent areas of the sheets which are not separated by the stop-weld material become unified together. The hot rolling of the sheets results in reducing the thickness of the two sheets and elongating the resultant blank in a direction of rolling while the width of the resultant blank remains substantially the same as the initial width of the sheets. Following the hot rolling operation, the resultant blank is usually softened, as by annealing, to make it more piable, and if desired it may then be cold rolled to the final gauge desired and again softened as by annealing. The stop-weld material results in the retention of an unwelded portion which extends internally within the interior of the blank between its outer surfaces. After softening the blank, the unjoined portion is expanded by injecting therein a fluid pressure of sufficient magnitude to permanently distend the blank in the areas of the unwelded portion to for mthe desired pattern of passageways. However, it is to be understood that other methods may also be employed in the manufacture of the sheet metal heat exchanger 1 illustrated in the drawings. For example, such a sheet metal heat exchanger may be made by the process disclosed in U.S. Letters Patent No. 2,779,086, granted to Rieppel et al. on January 29, 1957.

Broadly speaking, in accordance with one aspect of this invention, the heat exchanger 1, of FIGURE 1, may be formed into a finned structure by application of an appropriate tool which exerts a force at an angle to the web section sufficient to pierce the metal in this web section while simultaneously striking and severing a tab-like portion in projection from the panel; followed by drawing this tab-like portion sufficiently to both thin it and to elongate it in a direction of its projection from the panel.

Figure 3:
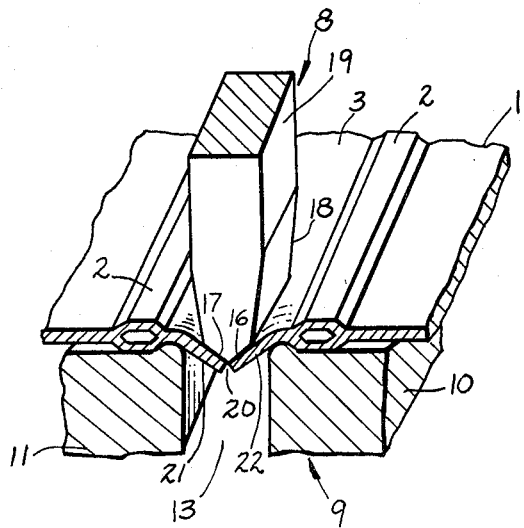
FIGURE 3 is a partial sectional view in perspective illustrating an intermediate phase in the method of this invention.
Figure 4:
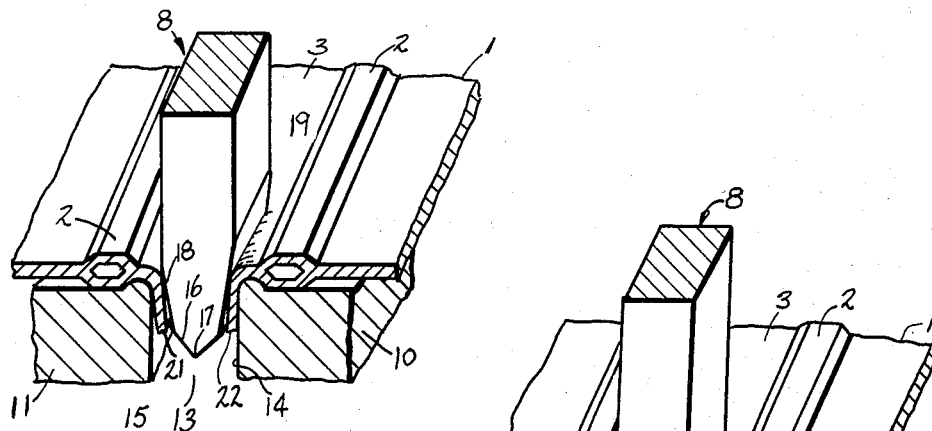
FIGURE 4 is a partial sectional view in perspective illustrating an intermediate phase of the method of this invention subsequent to that shown in FIGURE 3.
Figure 5:
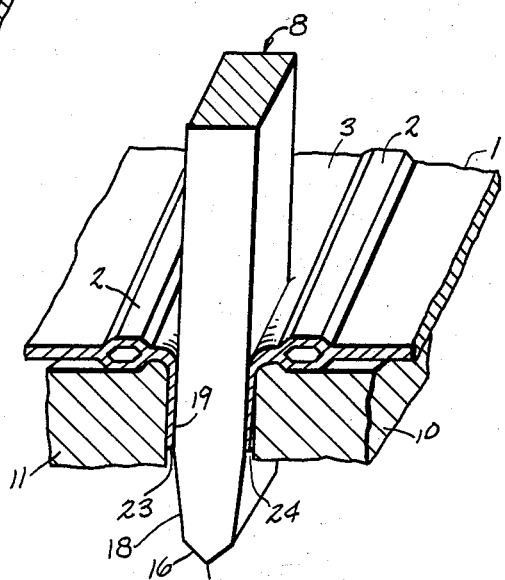
FIGURE 5 is a partial sectional view in perspective illustrating an intermediate phase of the method of this invention subsequent to that shown in FIGURE 4.

In accordance with another aspect of this invention the panel 1 may be fabricated into a fin structure by appropriately slitting the web section 3 to define a tab-like portion therein. For example, the slitting may take the shape of a C-shaped line of cut 4, or the piercing may take the form of a plurality of cuts shown on panel 1 adjacent to the C-shaped cut 4 and which may comprise a pair of parallel cuts 5 and 6 and a perpendicular cut 7 between and interconnecting cuts 5 and 6 intermediate their ends. In any event, one or more tab-like portions 21 and 22 will be formed which may then be conveniently bent out of and into an angle with the panel. Thereafter, these projecting tab-like portions 21 and 22 may be drawn sufficiently to thin and elongate them in the direction of their projection from the panel, as best illustrated in FIGURES 3 and 4.

Figure 2:
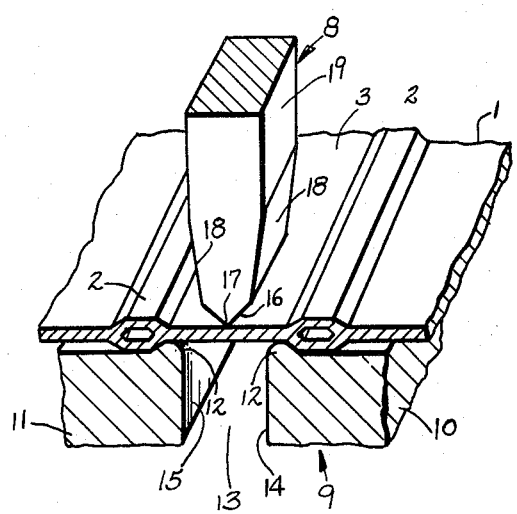
FIGURE 2 is a partial sectional view in perspective illustrating a sheet metal heat exchanger in conjunction with metal forming tools adapted for treating the illustrated heat exchanger in accordance with this invention.

More specifically, the invention contemplates the accomplishment of the piercing and drawing operations on panel 1 by means of a punch 8 and a die 9. As illustrated in FIGURE 2, the die 9 comprises two spaced die portions 10 and 11 on which panel 1 is placed with the spacing 13 defined between die surfaces 14 and 15 of these portions disposed below that portion of web section 3 which is to be pierced and drawn. As will be understood die portions 10 and 11 may coextend with the length of web section 3, or die portions 10 and 11 may comprise a plurality of pairs with each pair being disposed relative to each other to provide a spacing immediately below corresponding portions of the web section to be pierced and drawn. Although not required each die portion 10 and 11 is provided with a shoulder 12 which abuts against the adjacent protrusion or bulges of adjacent passageways 2.

Punch 8, as illustrated in the drawings, is arranged in vertical alignment with space 13 between die portions 10 and 11 in cooperating relationship therewith. Although punch 8 may be manipulated manually, this punch is preferably adapted by conventional means for reciprocal movement toward and away from cooperating relationship with die portions 10 and 11. Although various configurations for the punch may be employed and will be apparent in the art, the specific punch illustrated in the drawings comprises a beveled chisel-shaped foward end or nose portion 16 with a cutting edge 17, a tapered working portion 18 having the desired slope necessary for drawing of the fins, and a body portion 19. The dimension in width of the body portion 19, of punch 8, normal to die surfaces 14 and 15 is such that it will be spaced from each of die surfaces 14 and 15 an amount equal to the desired thickness of the ultimate fins desired. As shown in the drawing, the body portion 19 is extended to the forward or nose portion 16 by means of the tapered working portion 18 which is provided with sufficient slope to facilitate the desired extrusion of the desired fin elements. As regards the length or dimension of punch 8, in its body portion 19, in a direction parallel to die surfaces 14 and 15, it may be made of any magnitude desired provided it extrudes the struck tab-like portion to the corresponding length of the fin element formed.

In operation, when the punch 8 is lowered, the cutting edge 17 of nose portion 16 forces the abutted portion of web section 3 downwardly into space 13 between die surfaces 14 and 15 until the nose portion bulges the abutted portion of the web section to a sufficient depth at which point the cutting edge 17, of punch 8, splits the abutted web section along a shear line 20 whereby a tab-like portion is struck and severed from the panel 1 to project downwardly therefrom. As the movement of punch 8 continues downwardly, its tapered portion 18 enters and extends through the opening formed by the severed portion of web section 3. As tapered portion 18, of punch 8, continues in its travel through the web section 3, it draws or "irons out" the tab-like portions 21 and 22 to thin and elongate them in the direction of their projection from panel 1 to the extended length desired. As a result of the travel of the punch 8 through the web section 3, of panel 1, the initially struck out and severed tab portions are formed into the desired fin elements 23 and 24 leaving a perforation or opening through the web section 3 from which the fin elements were formed. The resultant product is a novel finned heat exchanger element having a fin matrix which is partially severed from web section 3 being bent along a fold line in the web section so as to project out of and at an angle to panel 1 leaving a perforation in the web section. It will also be observed that this novel heat exchanger element is a finned structure whose dimension on a first line normal to the fold line, upon which it is bent, is greater than the dimension of the resultant perforation along a second line normal to the fold line of the fin elements with each of the lines taken along extensions which intersect each other at the fold lines.

Figure 6:
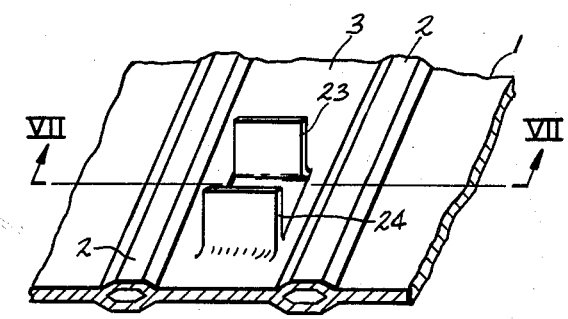
FIGURE 6 is a partial sectional view in perspective of a sheet metal heat exchanger obtained in accordance with the method of this invention.
Figure 7:
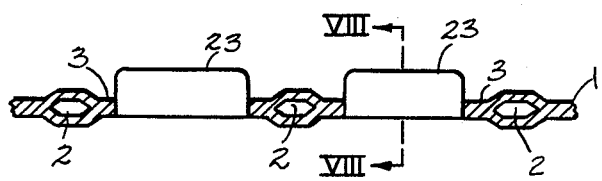
FIGURE 7 is a cross-sectional view taken along lines VII—VII of FIGURE 6.
Figure 8:
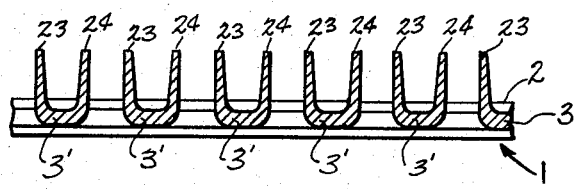
FIGURE 8 is a cross-sectional view taken along lines VIII—VIII of FIGURE 7.
Figure 9:
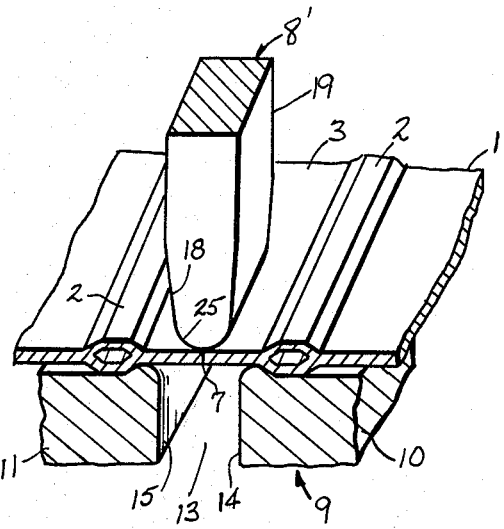
FIGURE 9 is a partial sectional view in perspective illustrating another embodiment of this invention.

Although the manufacture of a single pair of fin elements in conjunction with single perforations has been desribed, it will be readily apparent that a plurality of these pairs of fin elements may be provided. Such a multitude of fin elements may be provided by the use of a plurality of punches of the type 8 shown in the drawings, or the panel 1 may be advanced by any suitable means to progressively subject successive portions of web sections 3 to the action of punch 8. In this regard, although the preceding portions of this application were directed to the formation of fins having their planes substantially parallel with the extensions of tube 3, a similar panel is illustrated in FIGURE 6 which although obtained in accordance with the aforesaid embodiment, the structure of FIGURE 6 embodies a slight deviation in which the plane of fin elements 23 and 24 extends in a direction normal or transverse to the extension of tubular or fluid passages 2. As indicated above, although the structure FIGURE 6 is shown with a single pair of fin elements 23 and 24 a plurality of these fin elements may be provided in aligned or in any desired dispersed relationship along web section 3. Accordingly, presupposing provision of such a plurality of aligned pairs of fin elements 23 and 24, FIGURE 7 illustrates such a modification of FIGURE 6 taken along the line VIII—VIII. As can be appreciated the formation of fins in accordance with this invention in substance takes portions of web section 3 of panel 1 and extrudes these portions into a construction having a plane intersecting the plane of panel 1. As regards the formation in accordance with the specific embodiment described above, it can be seen that where a pair of fins are simultaneously formed they coextend with each other in spaced relationship. It will be apparent from the foregoing description that the method of this invention permits the fabrication of fins without need for extraneous or secondary elements requiring additional considerations for unifying them to the heat exchanger structure 1. Thus, this invention increases the heat exchange services of heat exchanger 1 from the primary surface of the panel in which the thickness of the resultant fin structures is substantially less than the web section from which they were formed, as for example the web section 3' between adjacent fin structures 23 and 24 as illustrated in FIGURE 8.

Figure 1A:
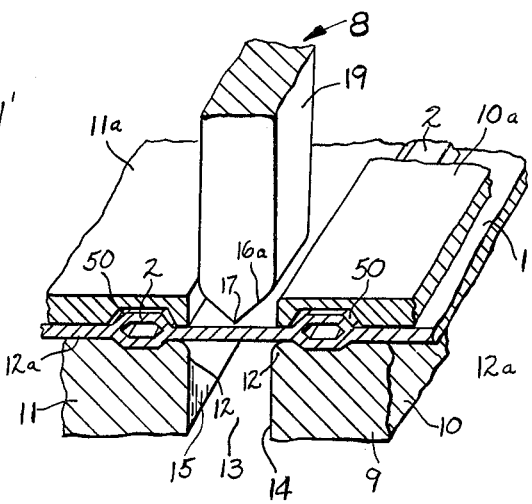
FIGURE 1A is a perspective view illustrating a refined modification of the embodiment of this invention illustrated in FIGURE 1.
Figure 15:
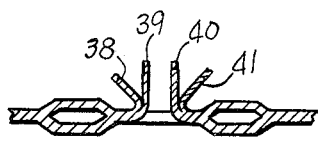
FIGURE 15 is a cross-sectional view in elevation of a sheet metal heat exchanger processed in accordance with the last said embodiment of this invention.

It is also noted that the specific embodiment has been described above in conjunction with the most basic elements required in the performance of this invention, and this embodiment can be advantageously improved by various modifications and refinements, as for example those illustrated in FIGURE 1A. As shown therein the die portions 10 and 11 are provided with supporting surfaces 12a which serve as a backup for the web sections 3 of the panel. Also, in order to restrain distortion of the panel, during the formation of the fin structure, the web sections 3 of the panel are clamped against die portions 10 and 11 by means of corresponding rigid pressure pads 10' and 11' suitably recessed at 50 to receive and accommodate the tubular passages 2. The instant embodiment also illustrates a modification in the configuration of punch 8 in which the beveled nose portion 16a extends directly to the body portion 19 which performs the desired drawing required in the formation of the fin structure.

Although a specific method for the manufacture of a simultaneous pair of fin elements has been described above, it is pointed out that, as indicated above, these pairs of finned structures may also be formed by a preliminary piercing or slitting of the web section 3 of panel 1 as indicated by cut 4 or cuts 5, 6, and 7 provided in the web section of panel 1, illustrated in FIGURE 1. This embodiment varies from the preceding embodiment described by the use of a punch 8' having a rounded forward or nose portion 25 which is disposed so as to be directed against slit 7 of web section 3 when panel 1 is placed upon die portions 10 and 11. As with the preceeding embodiment movement of punch 8' toward and between the die surfaces 14 and 15 bends the metal encompassed by lines 5, 6, and 7, along fold lines, into projecting tab-like portions which are subsequently extruded by the tapered working portion 18 of punch 8'.

Figure 10:
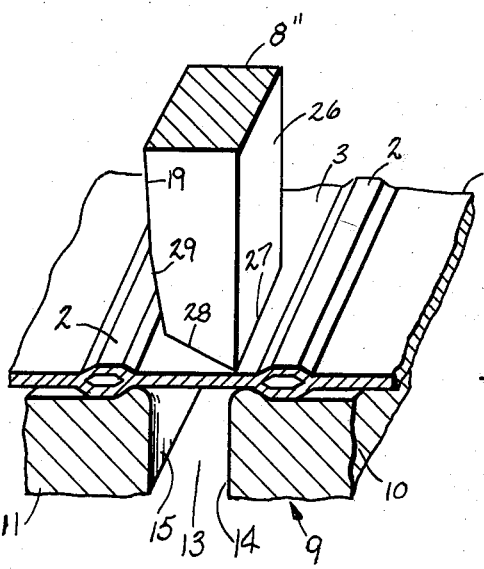
FIGURE 10 is a partial sectional view in perspective illustrating a still further embodiment of this invention.

A still further embodiment of this invention is illustrated in FIGURE 10 when the modification provides for the obtainment of a single tab-like, and the finally extruded fin element from portions of the web section 3 of panel 1. In this embodiment, punch 8" is provided with a substantially planar surface 26 which is adapted upon passage through panel 1 to move in very close proximity with die surface 14 of die portion 10. This punch 8" also distinguishes by its termination in a cutting edge 27 defined by the bevel 28 extending from the tapered working portion 29. In this embodiment downward movement of punch 8" cooperates with die portion 10 to sever or shear the portion of the web section 3 abutted by the cutting edge 27, with the portion of the web section intermediate a tube or passage 2 and the line of severance struck outwardly by the bevel 28 whereafter is drawn by the tapered working portion 29 to bend and elongate the tab-portions in the direction of their projection out of panel 1 to form the desired finned structure.

Figure 11:
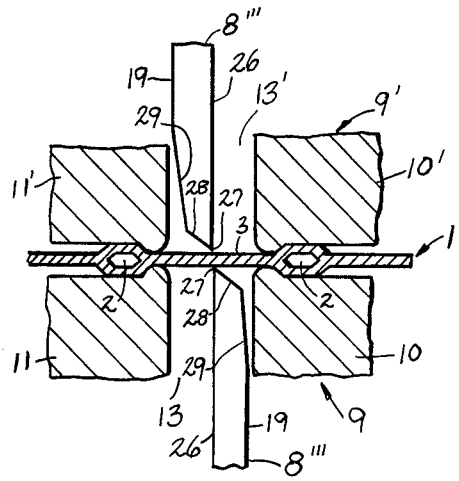
FIGURE 11 is a sectional view in elevation of still another embodiment of this invention.
Figure 12:
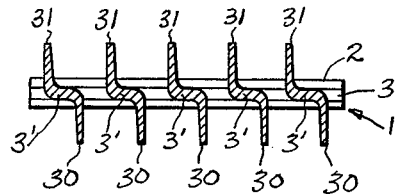
FIGURE 12 is a cross-sectional view in elevation of a finned sheet metal heat exchanger treated in accordance with the embodiment of FIGURE 11.

FIGURE 11 illustrates a still further modification of this invention in which adjacent fins are caused to project in opposite directions from the face of the panel. In this embodiment the panel 1 is clamped between a pair of cooperating die assemblies 9 and 9' having aligned openings 13 and 13' adapted to receive the opposing acting punches 8''' and 8'''. These punches 8''' are similar to the punch 8" illustrated in FIGURE 10 but adapted upon cooperation with each other to have their planar surfaces 26 pass in close proximity to each other permitting these punches to function in a nature of shears in order to provide the initial line of severance in that portion of web section 3 from which the fin elements are to be constructed. As will be apparent, movement of the punches 8''' toward each other through the respective openings 13 between the defining die portion projects and draws the resultant tab-like portion into the desired fin structures projecting from opposite sides of heat exchanger panel 1. The resultant formed finned heat exchanger is illustrated in FIGURE 12, where, as can be seen, portions of the web section 3 are adjacent the line of severance provided by the cooperating punches 8''' of FIGURE 1 are worked into adjacent fin structures which project from alternate sides of heat exchanger panel 1 and have a greatly reduced thickness relative to the original thickness of web section 3, as for example illustrated by the portion 3' of the web section between portions thereof utilized in the formation of the desired fin elements 30 and 31. In such an embodiment the heat exchanger panel 1 is provided with a plurality of fin elements which successively project from alternate sides of the heat exchanger.

Figure 13:
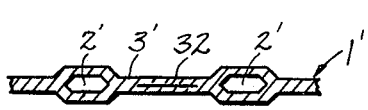
FIGURE 13 is a cross-sectional view of a sheet metal heat exchanger adapted for treatment in accordance with still another embodiment of this invention.
Figure 14:
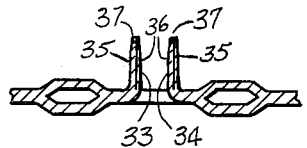
FIGURE 14 is a cross-sectional view of a sheet metal heat exchanger illustrating an intermediate phase in the treatment of the heat exchanger of FIGURE 13 in accordance with this invention.

Although the preceding embodiments described the attainment and provision of substantially solid fin elements on the heat exchanger, it is pointed out that the invention contemplates fabrication of fin structures from web sections of a heat exchanger containing an internal stratum of separation 32 disposed in spaced relationship to a system of fluid conduits. The attainment of such preliminary heat exchangers is known to the art and is illustrated in U.S. Letters Patent No. 2,991,047 granted to C. Bailys on July 4, 1961. The provision of such a stratum of separation 32 is readily amenable to the method described in the aforesaid Letters Patent No. 2,690,002, and can be obtained by the inclusion of a separate secondary pattern of separation material disposed between the superimposed sheets in spaced relationship to the primary pattern which defines the desired fluid conduit system. This secondary pattern is arranged in portions between the superimposed sheets which, after pressure welding, form the web section bounding the desired fluid conduit system and which portions of the web section are utilized in forming the fin elements in accordance with this invention. The formation of fin elements from heat exchanger panel 1', illustrated in FIGURE 13, may be obtained in accordance with any of the preceding embodiments of this invention discussed above. For example, where panel 1' is provided with fin elements in accordance with the first described embodiment of this invention, the resultant drawn fin elements 33 and 34 are characterized by a plurality of plies 35 and 36 formed by the subdivision of the preliminary fin elements along a line of separation 37. In this embodiment, the provision of a plurality of plies in the preliminary fin elements, drawn and formed from the web section, permits the further subdivision of the preliminary fin elements 33 and 34 into a plurality of sub fin structures 38 and 39, obtained from preliminary fin 33, and sub fin structures 40 and 41, obtained from preliminary fin structure 34. As will be apparent this embodiment permits a substantially greater increase in the heat exchange surface area of the heat exchanger.

It is to be understood that while two sub fins are shown in this embodiment, each preliminary fin portion can remain whole or be subdivided into any number of individual fins desired merely by the inclusion of a plurality of superposed layers of weld inhibiting material between a plurality of superimposed sheets of metal in the fabrication of a heat exchanger in accordance with the prior art methods discussed above, as for example, by the method of the aforesaid U.S. Letters Patent No. 2,690,002.

Accordingly, by any desired variation in the number of layers of stop-weld material interposed between a plurality of superimposed sheets, the preliminary fin elements can be subdivided into corresponding numbers. Thus, such variation may provide three or any greater number of sub fins which the specific application of the heat exchanger calls for. In addition, it is also to be understood that the heat exchanger panel may be of any varied modification either in the initial thickness of the web section 3, as for example in accordance with the method disclosed in the application of T. F. Pauls, Serial No. 663,062, filed June 3, 1957, now U.S. Patent No. 2,999,308, granted September 12, 1961, or of any tubular configuration such as is disclosed in the aforesaid U.S. Letters Patent No. 2,991,047.

In addition, although a simple internally laminated panel has been described, it is to be understood that the invention is equally applicable to sheets having other patterns of internal laminations either in a single stratum or a plurality of stratums, or in other configurations, as for example, the panel disclosed in the patent to Adams, U.S. 2,776,514, granted on October 16, 1956.

Accordingly, although the invention has been described with reference to specific embodiments, materials, and details, various modifications and changes, within the scope of this invention, will be apparent to one skilled in the art, and are contemplated to be embraced within the invention.

What is claimed is:

1. A method of making a finned sheet-like hollow article comprising forming a composite metal sheet adapted to internally contain in preselected areas thereof a system of fluid passages bounded by a web section of said sheet; piercing said sheet in the said web section thereof along intersecting lines to form a tab-like portion; bending said tab-like portion out of and to an angle with said sheet; and drawing said tab-like portion sufficiently to thin and elongate said tab-like portion in the direction of its projection from said sheet.

2. A method of making a finned sheet-like hollow article comprising forming a composite metal sheet adapted to contain in preselected areas thereof a system of fluid passages bounded by a web section of said sheet with said passages being adapted to contain a fluid under pressure; piercing said sheet in the said web section thereof along intersecting lines to form a pair of adjacent tab-like portions each having an edge formed from a common line of piercing; bending said tab-like portions out of and to an angle with said sheet; and drawing said tab-like portions sufficiently to thin and elongate said tab-like portions in the direction of their projection from said sheet.

3. A method of making a finned hollow sheet metal structure from a composite metal sheet formed by pressure-welding superimposed metal sheets having interposed therebetween a pattern of stop-weld material extending in a desired system of fluid passages and adapted to contain a fluid under pressure comprising providing a fin structure projecting out of and at an angle with said sheet by piercing the web section of said sheet along intersecting lines to strike and sever a tab-like portion therefrom and drawing said tab-like portion sufficiently to thin and elongate said tab-like portion in the direction of its projection from said sheet.

4. The method of claim 3 including piercing said sheet in at least two spaced portions of said web section to strike at least two of said tab-like portions, and drawing each said tab-like portions sufficiently to thin and elongate said tab-like portions in the direction of their projection from said sheet.

5. The method of claim 4 including piercing said sheet so that all of said tab-like portions are struck and drawn to project out of and away from the same face of said sheet so as to be disposed on the same side of said sheet.

6. The method of claim 4 including piercing said sheet so that one of said two tab-like portions is struck to project out of and away from one opposite face of said sheet, and the other of said two tab-like portions is struck to project out of and away from the other of said faces of said sheet.

7. The method of claim 3 including forming said sheet with a lamination in said web section defined by separable portions of said web section with said lamination being spaced from said pattern of stop-weld material; and wherein said piercing is directed through said lamination.

8. The method of claim 7 including separating the separable portions opposite the said lamination in said tab-like portion.

9. A method of making a finned hollow sheet metal structure formed by pressure-welding superimposed metal sheets having interposed therebetween a pattern of stop-weld material extending in a desired system of fluid passages and adapted to contain a fluid under pressure comprising providing fin structures projecting out of and at an angle with said sheet by piercing the web section of said sheet along intersecting lines to strike and sever a pair of adjacent tab-like portions therefrom with each said pair having a common line of said severance and drawing said tab-like portions sufficiently to thin and elongate said tab-like portions in the direction of their projection from said sheet.

10. The method of claim 9 including piercing said sheet to provide at least two pairs of said tab-like portions in spaced portions of said web section with all of the tab-like portions of all said pairs struck to project out of and away from the same face of said sheet.

11. The method of claim 9 including piercing said sheet in at least two spaced portions of said web section to strike at least two of said pairs of tab-like portions and drawing each of said tab-like portions to thin and elongate said tab-like portions in the direction of their elongation from said sheet.

12. The method of claim 11 including piercing said sheet so that all of said tab-like portions are struck and drawn to project out of and from the same face of said sheet so as to be disposed on the same side of said sheet.

13. The method of claim 11 including forming said sheet with a lamination in said web section defined by separable portions of said web section with said lamination being spaced from said pattern, and wherein said piercing is directed through said lamination to encompass a portion of said lamination in said tab-like portions.

14. The method of claim 13 including separating the separable portions in said tab-like portions opposite said lamination.

15. The method of claim 11 including striking a plurality of said pairs of tab-like portions from said sheet in spaced portions thereof to dispose in parallel relationship the said common line of piercing of all said pairs of tab-like portions.

16. The method of claim 15 including an aligning a first portion of said plurality of said pairs of tab-like portions in a first direction.

17. A method of making a finned hollow sheet metal structure from a composited metal sheet formed by pressure welding superimposed metal sheets having interposed between adjacent surfaces thereof a pattern of stop-weld material extending in a desired system of fluid passages and adapted to contain a fluid under pressure comprising interposing between said sheets a second pattern of stop-weld material distinct and separate from the first said pattern with said second pattern disposed in the desired web sections of said sheets spaced from and adjacent the first said pattern comprising providing a fin structure projecting out of and at an angle with said sheet by piercing said sheet in said web section along intersecting lines and through said second pattern to strike tab-like portion encompassing a portion of said second pattern; drawing said tab-like portion sufficiently to thin and elongate said tab-like portion in the direction of its projection from said sheet; and separating apart the portion of said web section in said thinned and elongated tab-like portions opposite said pattern.

References Cited by the Examiner

UNITED STATES PATENTS

| | | | |
|---|---|---|---|
| 2,034,523 | 3/36 | Milner | 29—163.5 |
| 2,157,354 | 5/39 | Sherman | 29—545 |
| 2,462,136 | 2/49 | Smith | 165—148 |
| 2,466,684 | 4/49 | Case | 165—148 |
| 2,632,633 | 3/53 | Hammond et al. | 29—157.3 X |
| 2,644,225 | 7/53 | Dietz | 29—157.3 |
| 2,686,957 | 8/54 | Koerper | 29—157.3 |
| 2,759,247 | 8/56 | Grenell | 29—157.3 |
| 2,856,162 | 10/58 | Adams. | |
| 2,991,047 | 7/61 | Bailys. | |
| 2,999,308 | 9/61 | Pauls. | |
| 3,046,758 | 7/62 | Hever. | |
| 3,052,149 | 9/62 | West | 29—163.5 X |
| 3,121,940 | 2/64 | Cospen. | |

FOREIGN PATENTS

| | | |
|---|---|---|
| 109,538 | 1/40 | Australia. |
| 214,980 | 5/58 | Australia. |
| 580,387 | 7/59 | Canada. |
| 1,212,813 | 10/59 | France. |
| 857,270 | 11/52 | Germany. |

WHITMORE A. WILTZ, *Primary Examiner.*

CHARLES SUKALO, *Examiner.*